US012035096B2

(12) United States Patent
Blair

(10) Patent No.: US 12,035,096 B2
(45) **Date of Patent: *Jul. 9, 2024**

(54) PERSONAL ACOUSTIC SYSTEMS AND FLEXIBLE EARPIECE MOUNTS FOR THE SAME

(71) Applicant: Koss Corporation, Milwaukee, WI (US)

(72) Inventor: Nicholas S. Blair, Milwaukee, WI (US)

(73) Assignee: Koss Corporation, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,016

(22) Filed: Apr. 28, 2023

(65) Prior Publication Data

US 2023/0336905 A1 Oct. 19, 2023

Related U.S. Application Data

(63) Continuation of application No. 17/942,477, filed on Sep. 12, 2022, now Pat. No. 11,671,743, which is a continuation of application No. 17/176,540, filed on Feb. 16, 2021, now Pat. No. 11,477,565, which is a continuation of application No. 16/729,945, filed on Dec. 30, 2019, now Pat. No. 10,959,014, which is a continuation of application No. 16/133,068, filed on Sep. 17, 2018, now Pat. No. 10,531,176, which is a continuation of application No. 14/660,292, filed on Mar. 17, 2015, now Pat. No. 10,136,210.

(51) Int. Cl.
*H04R 1/10* (2006.01)
*H04R 31/00* (2006.01)

(52) U.S. Cl.
CPC ........... *H04R 1/105* (2013.01); *H04R 1/1066* (2013.01); *H04R 31/00* (2013.01); *H04R 1/1008* (2013.01); *H04R 2201/105* (2013.01)

(58) Field of Classification Search
CPC ...... H04R 1/105; H04R 1/1066; H04R 31/00; H04R 1/1008; H04R 2201/105
USPC .......................................................... 381/378
See application file for complete search history.

(56) References Cited

U.S. PATENT DOCUMENTS

| | | | | |
|---|---|---|---|---|
| 4,471,496 A * | 9/1984 | Gardner, Jr. | A61F 11/14 | 2/209 |
| 6,229,901 B1 * | 5/2001 | Mickelson | A61F 11/30 | 181/129 |
| 6,374,126 B1 * | 4/2002 | MacDonald, Jr. | H04M 1/05 | 381/374 |
| 2012/0105740 A1 * | 5/2012 | Jannard | G02B 27/017 | 351/158 |
| 2013/0077814 A1 * | 3/2013 | Stephenson | H04R 1/1066 | 381/370 |

FOREIGN PATENT DOCUMENTS

GB 2512105 A * 9/2014 ........... H04R 1/1008

* cited by examiner

*Primary Examiner* — Sean H Nguyen
(74) *Attorney, Agent, or Firm* — K&L Gates LLP

(57) ABSTRACT

A personal acoustic system and flexible mount for the same are disclosed. The flexible mount is comprised of an elastomeric material. The personal acoustic system further includes a band comprising a first mount and an earpiece comprising a second mount. An acoustic element is housed within the earpiece. The elastomeric mount is positioned intermediate the first mount and the second mount to flexibly connect the band to the earpiece.

20 Claims, 12 Drawing Sheets

PERSONAL ACOUSTIC SYSTEMS AND FLEXIBLE EARPIECE MOUNTS FOR THE SAME

CROSS-REFERENCE TO RELATED APPLICATIONS

This application is a continuation application claiming priority under 35 U.S.C. § 120 to U.S. patent application Ser. No. 17/942,477, entitled PERSONAL ACOUSTIC SYSTEMS AND FLEXIBLE EARPIECE MOUNTS FOR THE SAME, filed Sep. 12, 2022, now U.S. Patent Application Publication No. 2023/0007377, which is a continuation application claiming priority under 35 U.S.C. § 120 to U.S. patent application Ser. No. 17/176,540, entitled PERSONAL ACOUSTIC SYSTEMS AND FLEXIBLE EARPIECE MOUNTS FOR THE SAME, filed Feb. 16, 2021, now U.S. Pat. No. 11,477,565, which is a continuation application claiming priority under 35 U.S.C. § 120 to U.S. patent application Ser. No. 16/729,945, entitled PERSONAL ACOUSTIC SYSTEMS AND FLEXIBLE EARPIECE MOUNTS FOR THE SAME, filed Dec. 30, 2019, now U.S. Pat. No. 10,959,014, which is a continuation application claiming priority under 35 U.S.C. § 120 to U.S. patent application Ser. No. 16/133,068, entitled PERSONAL ACOUSTIC SYSTEMS AND FLEXIBLE EARPIECE MOUNTS FOR THE SAME, filed Sep. 17, 2018, now U.S. Pat. No. 10,531,176, which is a continuation application claiming priority under 35 U.S.C. § 120 to U.S. patent application Ser. No. 14/660,292, entitled PERSONAL ACOUSTIC SYSTEMS AND FLEXIBLE EARPIECE MOUNTS FOR THE SAME, filed Mar. 17, 2015, now U.S. Pat. No. 10,136,210, the entire disclosures of which are hereby incorporated by reference herein.

FIELD

The present disclosure relates to flexible earpiece mounts for personal acoustic systems and methods for manufacturing and assembling the same.

BACKGROUND

A personal headphone assembly or other type of personal acoustic system often includes a band and at least one acoustic speaker connected to a respective end of the band. The band may be a headband that is configured to be positioned relative to (e.g., over) a user's head and/or neck to hold the acoustic element(s) relative to (e.g., over, in, or on) the user's ear(s). The user's comfort, the sound quality of the acoustic element(s), and/or other objectives often are improved when the earpiece fits snugly on, over and/or around the user's ear(s). Due to variations in the shape and size of peoples' heads, as well as variations in personal preferences regarding the positioning and fit of personal acoustic systems, it is often difficult to design earphones that comfortably adjust to and/or fit large groups of people.

The foregoing discussion is intended only to illustrate various aspects of the related art in the field and should not be taken as a disavowal of claim scope.

SUMMARY

In a general aspect, the present invention is directed to an assembly, such as a personal acoustic system, that comprises a headband, an earpiece, and an elastomeric grommet flexibly connecting the band to the earpiece. The headband comprises a first mount, and the earpiece comprises a second mount and an electroacoustic speaker. The elastomeric grommet is positioned intermediate the first mount and the second mount. The elastomeric grommet can be flexible—more flexible than the headband or earpiece—such that the elastomeric grommet will flex or deform in response to small external forces and loads, such as forces or loads caused by the position or movement of the user's head, and the other components (e.g., the band and the earpiece) will not. Accordingly, such small external forces will result in the relative change in the position and orientation between the headband and the earpiece to enhance the user's comfort level and/or fit when wearing the personal acoustic system. In various implementations, the assembly could also comprise a second earpiece and a second elastomeric grommet flexibly connecting the headband to the second earpiece.

In another general aspect, the present invention is directed to a method of manufacturing such a headphone assembly. The manufacturing method can comprise molding an elastomeric grommet at an end of a band of the headphone assembly and connecting the elastomeric grommet to a mount of an earpiece of the headphone assembly. The earpiece comprises an electroacoustic speaker. Co-molding the elastomeric grommet and the band of the headphone assembly can form a lasting and close-fitting connection between the elastomeric grommet and the band.

These and other benefits of the present invention will be apparent from the description to follow.

BRIEF DESCRIPTION OF THE DRAWINGS

Various features of the embodiments described herein are set forth with particularity in the appended claims. The various embodiments, however, both as to organization and methods of operation, together with advantages thereof, may be understood in accordance with the following description taken in conjunction with the accompanying drawings in which:

Figure 1:
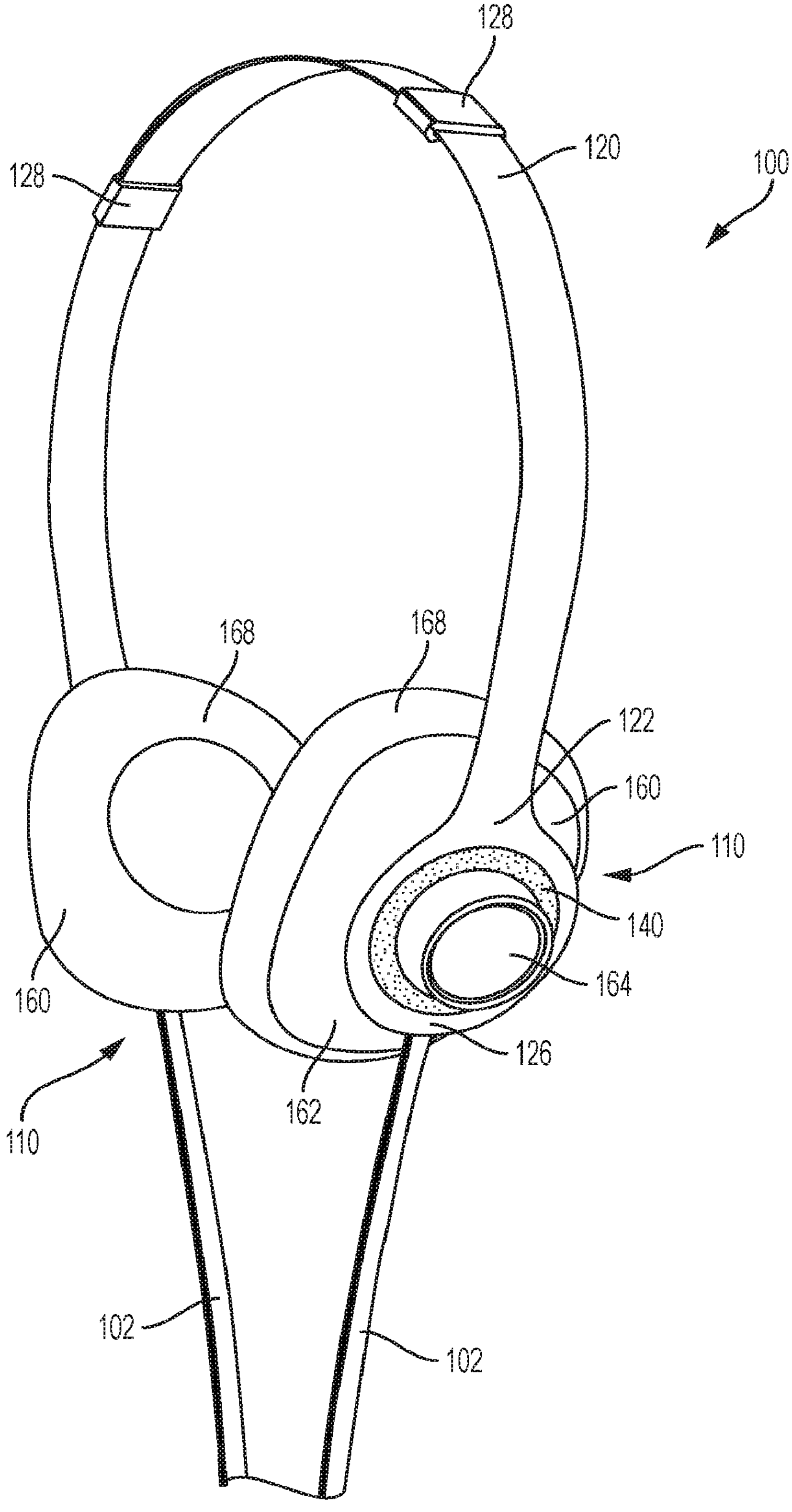
FIG. 1 is a perspective view of a personal acoustic system, according to at least one embodiment of the present disclosure.

The exemplifications set out herein illustrate various embodiments of the present disclosure, in at least one form, and such exemplifications are not to be construed as limiting the scope of the claims in any manner.

DETAILED DESCRIPTION

A personal acoustic system can include a band and at least one acoustic element operably coupled to the band. For example, the personal acoustic system can include at least one earpiece—one at each end of the band, for example—and at least one acoustic element can be positioned and/or housed within each earpiece. The earpiece(s) can be coupled to the band. For example, the band can include a pair of earpieces, and each earpiece can be adapted for placement relative to one of the user's ears. The earpiece(s) of the system can be flexibly mounted to the band such that the position and orientation of the earpiece(s) can adjust to the shape and size of the user's head and/or neck, as well as the placement preferences of the user, when the band is placed relative to and/or about the user's head. For example, an earpiece can be flexibly mounted to each end of the band. When the band is placed relative to the user's head, the flexibly-mounted earpiece(s) can be configured to rotate, articulate, shift and/or pivot to accommodate the user and comfortably fit about, on, around, and/or relative to the user's ears.

In certain instances, at least one pivot linkage and/or ball joint can be positioned intermediate the band and each earpiece to flexibly connect the earpiece to the band. The pivot linkage(s) and/or the ball joint(s) can move and/or rotate to effect adjustments to the positioning and orientation of the earpiece relative to the user's head. However, in certain circumstances, such moving linkages and/or joints can be susceptible to wear and/or failure as a result of long-term and/or rigorous use, for example. Additionally, complicated mechanical assemblies having multiple moving parts can be expensive and time-consuming to manufacture and/or assemble, which can increase the cost of the personal acoustic system.

In other instances, as described in greater detail herein, a flexible mount comprising an elastomeric member can be positioned intermediate the band and each earpiece to flexibly connect each earpiece to the band. The elastomeric member can comprise an elastomeric material that permits flexing and/or deformation of the elastomeric member, such that when the elastomeric member flexes or deforms, the relative position and orientation of the band to the earpiece correspondingly changes. For example, the modulus of elasticity of the elastomeric member can be less than the modulus of elasticity of the adjacent components of the personal acoustic system. In particular, the modulus of elasticity of the elastomeric member can be less than the modulus of elasticity of the band, the earpiece and/or the mounting portions of the band and/or the earpiece. That way, the elastomeric member will flex or deform in response to small external forces and loads (such as forces or loads caused by the position or movement of the user's head) and the other components (e.g., the band and the earpiece) will not, so that the small external forces will result in the relative change in the position and orientation between the band to the earpiece to enhance the user's comfort level and/or fit when wearing the personal acoustic system.

As the elastomeric member between the band and the earpiece flexes between a neutral configuration and at least one flexed or deformed configuration, the earpiece can shift relative to the band. For example, the earpiece can be oriented at different angle(s) relative to the band. As a result, the earpiece can be adjustably positioned relative to the user's ears. In certain instances, a flexible mount comprising the elastomeric member can be free of moving linkages and/or joints, and thus, can resist wear and/or premature failure. Such a flexible mount can also define a low profile while providing suitable adjustability. Moreover, a flexible mount that is free of moving linkages and/or joints can be more cost-effectively manufactured and/or assembled, which can reduce the cost of the personal acoustic system.

Referring now to FIGS. 1-8, a personal acoustic system 100, as well as subassemblies and components thereof, are depicted. The personal acoustic system 100 includes a band 120, earpieces 160 at respective ends of the band 120, and flexible mounts 140 connecting the earpieces 160 to the band 120. The personal acoustic system 100 can be adapted for use as an audio headphone system, noise cancellation or abatement system, noise isolation system, and/or various other suitable uses. A flexible mount 140 is positioned intermediate the band 120 and each earpiece 160 to flexibly secure each earpiece 160 to the band 120. Each earpiece 160 and flexible mount 140 can form an ear assembly 110 of the personal acoustic system 100. In the depicted embodiment, the personal acoustic system 100 includes a pair of ear assemblies 110. In other instances, the personal acoustic system 100 may include a single ear assembly 110.

Figure 2:
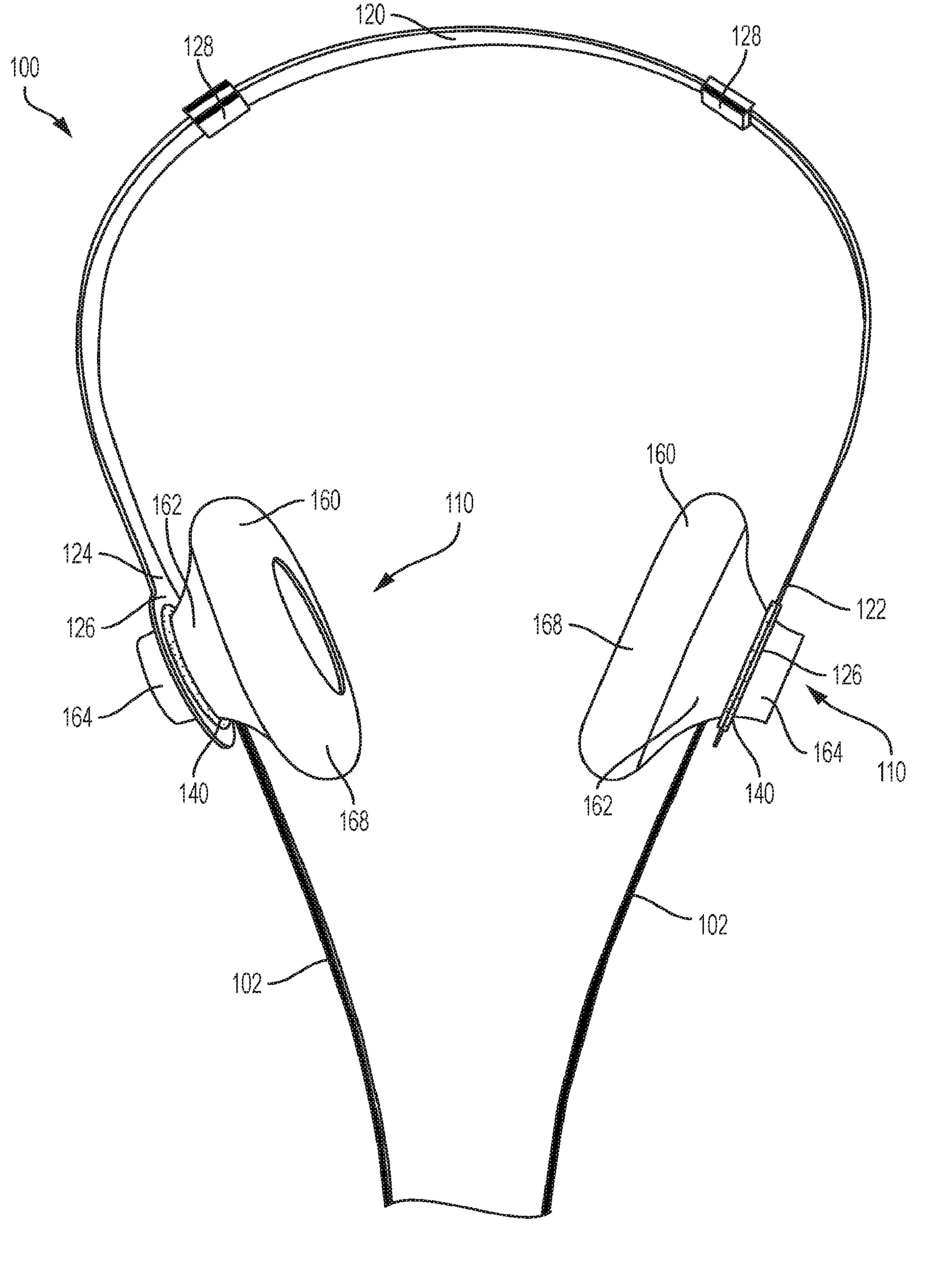
FIG. 2 is an elevation view of the personal acoustic system of FIG. 1, according to at least one embodiment of the present disclosure.
Figure 3:
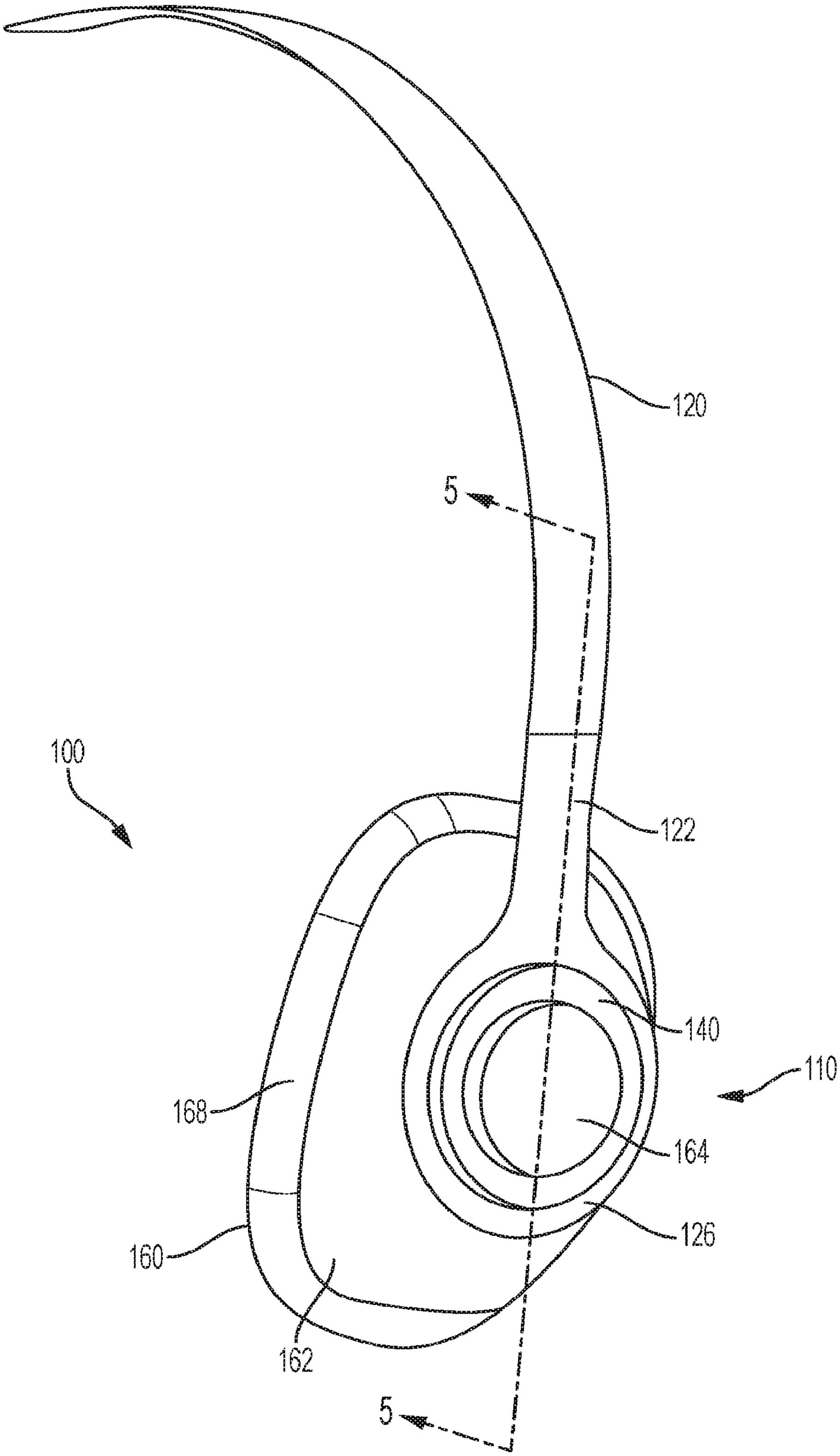
FIG. 3 is a perspective view of a portion of the personal acoustic system of FIG. 1, according to at least one embodiment of the present disclosure.

Referring primarily to FIGS. 1 and 2, the band 120 includes a first end portion 122 and a second end portion 124 opposite the first end portion 122. A yoke or attachment portion 126 extends from each end portion 122, 124. The yoke 126 provides a mounting surface and/or structure for engaging the flexible mount 140. For example, the yoke 126 shown in FIGS. 1-8 forms an inner mounting surface 130 that can retain one of the flexible mounts 140 therein. The modulus of elasticity of the yoke 126 is greater than the modulus of elasticity of the flexible mount 140 coupled thereto. In various instances, the band 120 and/or the yoke(s) 126 of the personal acoustic system 100 can be comprised of a metallic and/or plastic material (e.g., rigid or non-elastomeric plastic material).

In various instances, the band 120 can include multiple components that are fitted or otherwise connected together such that the dimensions of the band 120 can be adjusted.

For example, the band 120 shown in FIGS. 1 and 2 includes adjustment slides 128 toward the center of the band 120, which are configured to adjust the distance between the first end portion 122 and the second end portion 124. In other instances, the band 120 can define a unitary piece.

Figure 4:
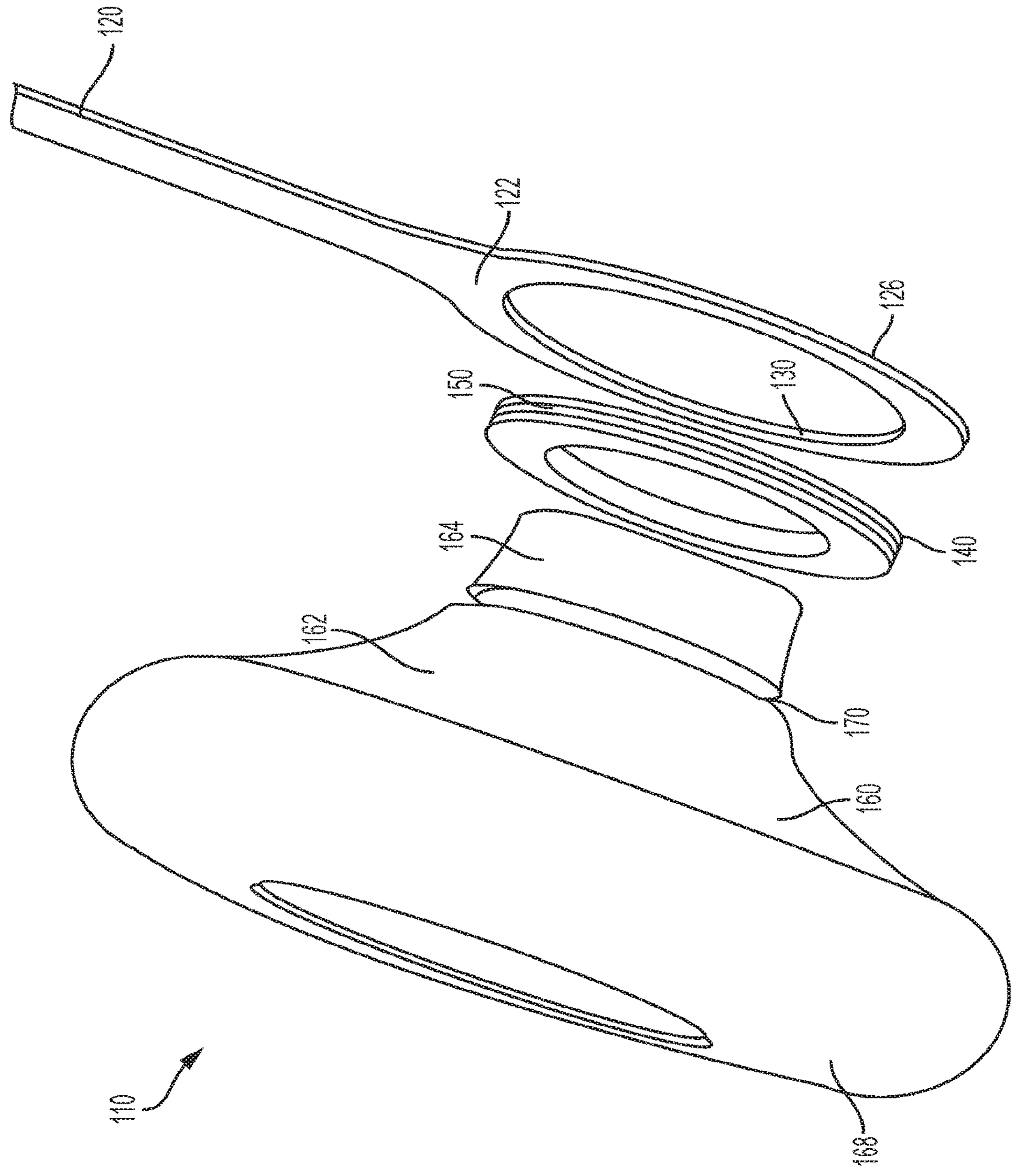
FIG. 4 is an exploded perspective view of an ear assembly and an end portion of the band of the personal acoustic system of FIG. 1, according to at least one embodiment of the present disclosure.
Figure 5:
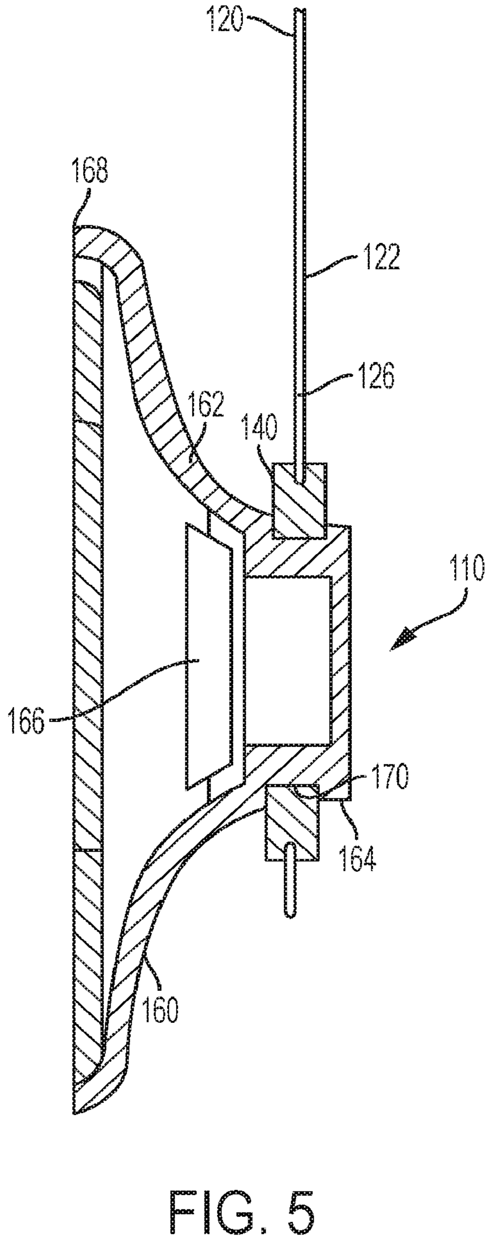
FIG. 5 is a cross-sectional elevation view of the ear assembly and the end portion of the band of FIG. 4 taken along the plane 3-3 indicated in FIG. 3, according to at least one embodiment of the present disclosure.

In various instances, the yoke 126 can comprise a circular and/or semi-circular ring extending from the band 120, as shown in FIG. 4. In such instances, the inner mounting surface 130 of the yoke 126 forms an annular mounting surface for the flexible mount 140. The flexible mount 140 can be positioned at least partially within the inner circumference of such an annular mounting surface. As described herein, the flexible mount 140 can be coupled to the yoke 126 by a grooved connection (e.g., a tongue-and-groove connection between the flexible mount 140 and the yoke 126). In other instances, the yoke 126 can be integrally-formed with the band 120. Additionally or alternatively, the yoke 126 can be connected to the band with fasteners, adhesive, and/or additional coupling means, as described in greater detail herein.

The earpiece 160 of each ear assembly 110 includes a housing 162, a mounting portion 164, and a user-engaging portion 168. Referring primarily to FIG. 4, the user-engaging portion 168 is positioned opposite the mounting portion 164, such that when worn by the user, the user-engaging portion 168 faces the user's head and the mounting portion 164 extends away from the user's head. The housing 162 can be positioned between the user-engaging portion 168 and the mounting portion 164. In other instances, the housing 162 can form at least a portion of the user-engaging portion and/or the mounting portion 164. The housing 162 can be configured to house and/or receive at least one acoustic element 166 (FIGS. 5-8), such as an electroacoustic speaker, for example, therein. In various instances, electroacoustic speaker(s) 166 within the housing 162 can be coupled to a wire conduit 102 (FIGS. 1 and 2) extending from the earpiece 160. The wire conduit(s) 102 can be adapted to carry electrical signals from an audio player device (not shown) to the electroacoustic speaker(s) 166 housed within the housing 162 of the earpiece 160 that the electroacoustic speaker(s) 166 convert to audio. In other instances, one of the earpieces 160 of the personal acoustic system 100 can include the wire conduit 102 as depicted in FIGS. 1 and 2 and the other earpiece 160 of the personal acoustic system 100 can be wired to the system 100 by a secondary conduit extending through the band 120 between the earpieces 160. In such instances, the secondary conduit extending through the band 120 can be routed through a channel defined in the flexible member 140. The conduit can extend through the channel in the flexible member 140 to reach the earpiece 160 attached to the opposite end of the band 120. During use, the flexible member 140 can be configured to flex, as described herein, around the secondary conduit. In various instances, the earpiece(s) 160 and/or at least the mounting portion 164 thereof can be comprised of a metallic and/or plastic material (e.g., rigid or non-elastomeric plastic material). The modulus of elasticity of the mounting portion(s) 164 is greater than the modulus of elasticity of the flexible mount 140.

The earpiece 160 can be structured and adapted to fit onto and/or around a user's ears. For example, each earpiece 160 can form a conical or frusto-conical cup for placement around the user's ear. The cupped and/or substantially conical geometry can direct sound waves from the speaker 166 to the user's ears when the user-engaging portion 168 is positioned against, on, around, and/or about the user's ears. For example, the user-engaging portion 168 can define a perimeter and/or edge for placement at least partially against the user's head. Moreover, when the band 120 is positioned on the user's head, the user's ear can be positioned at least partially within the cup defined by the earpiece 160. In certain instances, the user-engaging portion 168 can comprise a compliant and/or pliable material. For example, the user-engaging portion 168 can include a cushion and/or can be fabricated from a compliant and/or pliable material, such as foam, for example. Such a cushion can be positioned in abutting engagement with the user's head and/or ears when the band 120 is positioned relative to the user's head and/or when the earpieces 160 are positioned relative to the user's ears.

As described herein, each flexible mount 140 can flexibly couple one of the earpieces 160 to the band 120. In certain instances, the flexible mount 140 can be coupled between the earpiece 160 and the band 120 without complex mechanical assemblies and/or additional fasteners. For example, annular tongue-and-groove arrangements and/or friction-fit components can secure the flexible mount 140 to one of the earpieces 160 and/or to the band 120. The flexible mount 140 can be positioned in abutting engagement with the less flexible portions of the earpiece 160 and/or the band 120. In some instances, the flexible mount 140 can be integrally formed with one of the earpieces 160 and/or the band 120. For example, the flexible mount 140 can be co-molded and/or injection-molded at least partially around and/or to either an earpiece 160 and/or the band 120. Additionally or alternatively, the flexible mount 140 can be snap-fit to either the earpiece 160 and/or the band 120. In certain instances, the flexible mount 140 can be adhered to either the earpiece 160 and/or the band 120.

FIG. 4 depicts the ear assembly 110 and the first end portion 122 of the band 120 in an exploded view for illustrative purposes. This figure shows that the mounting portion 164 of the earpiece 160 can include a groove 170 defined therein that defines an outer mounting surface for the flexible mount 140. The groove 170 extends around the outside perimeter of the mounting portion 164. In other instances, the groove 170 may extend around a portion of the perimeter of the mounting portion 164. In the depicted embodiment, the groove 170 forms an annular and circumferential mounting surface to which the flexible mount 140 can be coupled. For example, the groove 170 is dimensioned and structured to receive at least a portion of the flexible mount 140 to connect the flexible mount 140 to the earpiece 160.

The flexible mount 140 is configured to be positioned at least partially around the mounting portion 164 of the earpiece 160 and retained at least partially within the groove 170 to secure the flexible mount 140 to the earpiece 160. In various instances, the width of the groove 170 can be sufficient to receive and securely hold the flexible mount 140 therein. In certain instances, the flexible mount 140 can securely fit within the groove 170. In various instances, a portion of the flexible mount 140, such as an annular projection and/or ridge, for example, can be configured to securely fit within the groove 170. In some instances, at least a portion of the flexible mount 140 can compressively fit within the groove 170. In various instances, at least a portion of the flexible mount 140 can be snap-fit and/or friction-fit within the groove 170.

In various instances, the flexible mount 140 can be integrally formed with the earpiece 160. For example, the flexible mount 140 can be molded onto and/or at least partially around the earpiece 160. In certain instances, the flexible mount 140 and the earpiece 160 can be co-molded.

For example, the earpiece 160 and/or the mounting portion 164 thereof can be formed in a first mold with an injection molding technique. The injection-molded part, e.g., the earpiece 160, can then be placed into a second mold. Elastomeric material for forming the flexible mount 140 can be added to the second mold along with the injection-molded part. The flexible mount 140 can be molded around the injection-molded part in the second mold. In certain instances, heat and/or pressure can be applied to the elastomeric material to form the elastomeric material around the injection-molded part within the second mold and to unify the elastomeric material and the injection-molded part. In such instances, the flexible mount 140 and the earpiece 160 can form a co-molded subassembly of the personal acoustic system 100, for example. Additionally or alternatively, the flexible mount 140 can be adhered to the earpiece 160, such as with an adhesive positioned between the flexible mount 140 and the earpiece 160 to adhere the flexible mount 140 to the earpiece 160. Additionally or alternatively, a mechanical fastener, such as a clip, for example, can secure the flexible mount 140 to the earpiece 160.

As described herein, the flexible mount 140 is configured to be positioned around at least a portion of earpiece 160, such as the mounting portion 164 and/or annular mounting surface, thereof. In certain instances, the flexible mount 140 can form a ring and/or a substantially ring-shaped portion. For example, the flexible mount 140 can comprise an annular grommet around the mounting portion 164 of the earpiece 160. Referring primarily to the embodiment depicted in FIG. 4, the flexible mount 140 forms an annular member or grommet, which is configured to fit around the perimeter of the mounting portion 164 of the earpiece 160. A tongue-and-groove arrangement can secure the flexible mount 140 to the mounting portion 164 of the earpiece. In various instances, an inner portion and/or surface of the flexible mount 140 can comprise an inner mounting surface, and an outer portion and/or surface of the mounting portion 164 can comprise an outer mounting surface. For example, an inside portion of the flexible mount 140 can be retained within the groove 170 in the mounting portion 164. In other instances, the flexible mount 140 can comprise a groove, and a ridge protruding from the mounting portion 164 of the earpiece 160 can be held and retained within the groove of the flexible mount 140.

The flexible mount 140 is comprised of a material having a low modulus of elasticity. For example, the flexible mount 140 preferably comprises an elastomeric material. The flexible mount 140 can be comprised of a thermoplastic elastomer and/or silicone. In certain instances, the flexible mount 140 can be comprised of natural and/or synthetic rubber. The elastomeric material of the flexible mount 140 can permit flexing and/or elastic deformation of the flexible mount 140 when a load is applied thereto. The flexible mount 140 is resilient. In particular, the flexible mount 140 is configured to repeatedly flex under stress and return to its original shape after the stress has been removed. In various instances, the flexible mount 140 can be repeatedly deformed up to twice its undeformed length, for example. In certain instances, the elastomeric material comprises a Shore A harness of about 60, a tensile strength of about 685 psi, a shrinkage of about 0.003 in/in, a tear strength of about 57 pli, and/or an elongation of about 300%, for example.

Figure 6:
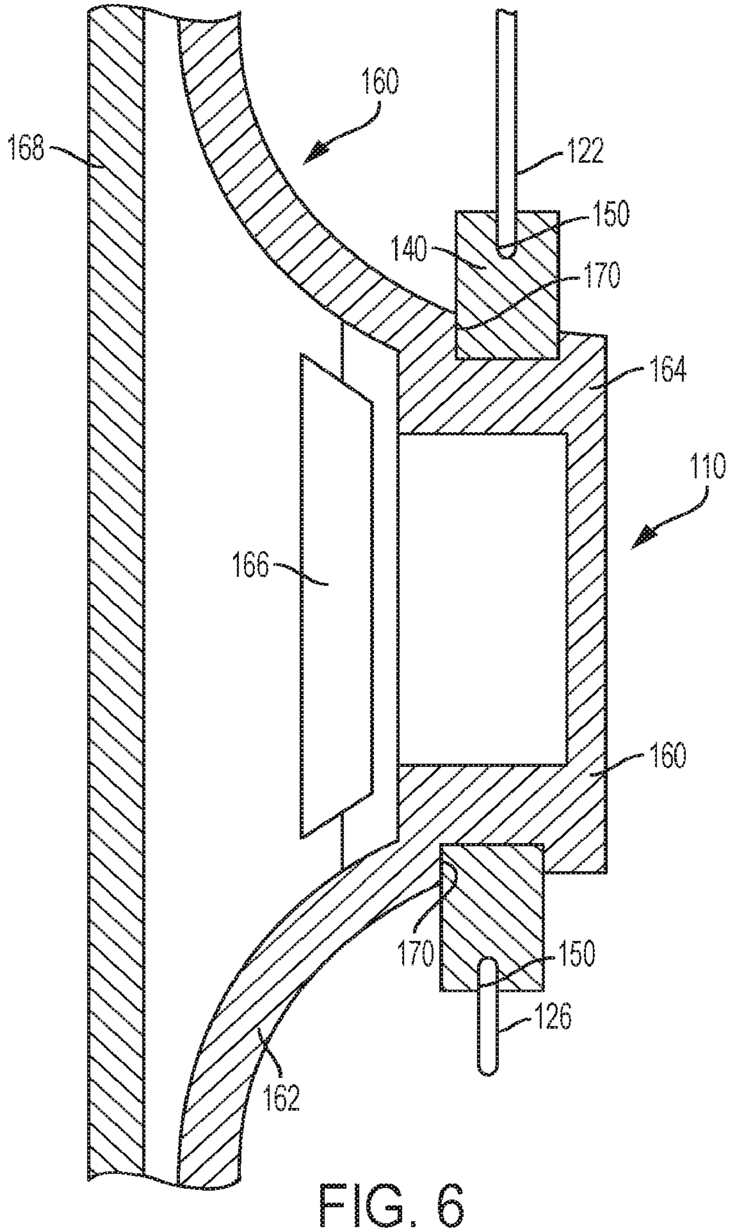
FIG. 6 is a detail cross-sectional elevation view of the ear assembly and the end portion of the band of FIG. 4 taken along the plane 3-3 indicated in FIG. 3, according to at least one embodiment of the present disclosure.

The flexible mount 140 is configured to be coupled to the band 120. For example, the flexible mount 140 can be coupled to the yoke 126 at the end portion 122, 124 of the band 120. Referring primarily to FIG. 6, the flexible mount 140 includes the annular, circumferential groove 150 defined therein that extends around the perimeter of the flexible mount 140 and forms an annular mounting surface for the yoke 126. For example, the groove 150 can be dimensioned and structured to receive the yoke 126. The yoke 126 can include an inside mounting portion and/or surface, and the flexible mount 140 can include an outside mounting portion and/or surface configured to mount to the inside mounting portion and/or surface of the yoke 126.

The yoke 126 can be positioned at least partially around the earpiece 160 and connected to the earpiece 160 by the flexible mount 140. For example, at least a portion of the yoke 126 can be retained at least partially within the groove 150 of the flexible mount 140 to secure the flexible mount 140 to the band 120. In various instances, the width of the groove 150 can be sufficient to receive and securely hold the yoke 126 therein. In certain instances, the yoke 126 can securely fit within the groove 150. In other instances, a portion of the yoke 126, such as an annular projection and/or ridge, for example, can be configured to securely fit within the groove 150. In some instances, at least a portion of the yoke 126 can compressively fit within the groove 150. In various instances, at least a portion of the yoke 126 can be snap-fit and/or friction fit within the groove 150.

In certain instances, the flexible mount 140 can be integrally formed with the band 120. For example, the flexible mount 140 can be molded onto and/or at least partially around the band 120 and/or the yoke 126 thereof. In certain instances, the flexible mount 140 and the band 120 can be co-molded. For example, the band 120 and/or the yoke 126 thereof can be formed in a first mold with an injection molding technique. The injection-molded part, e.g., the yoke 126, can then be placed into a second mold. Elastomeric material for forming the flexible mount 140 can be added to the second mold along with the injection-molded part. The flexible mount 140 can be molded around the injection-molded part in the second mold. In certain instances, heat and/or pressure can be applied to the elastomeric material to form the elastomeric material around the injection-molded part within the second mold and to unify the elastomeric material and the injection-molded part. In such instances, the flexible mount 140 and the yoke 126 can form a co-molded subassembly of the personal acoustic system 100, for example. Additionally or alternatively, the flexible mount 140 can be adhered to the yoke 126. For example, an adhesive can be positioned between the flexible mount 140 and the yoke 126 to adhere the flexible mount 140 to the band 120. Additionally or alternatively, a mechanical fastener, such as a clip, for example, can secure the flexible mount 140 to the band 120 and/or the yoke 126 thereof.

As described herein, a tongue-and-groove arrangement can secure the flexible mount 140 to the yoke 126 of the band 120. In various instances, an outer portion and/or surface of the flexible mount 144 can comprise an outer mounting surface, and an inner portion and/or surface of the yoke 126 can comprise an inner mounting surface. For example, an inside portion of the yoke 126 can be retained within the groove 150 in the flexible mount 140. In other instances, the yoke 126 can comprise a groove, and a ridge protruding from the flexible mount 140 can be held and retained within the groove of the yoke 126.

Figure 8:
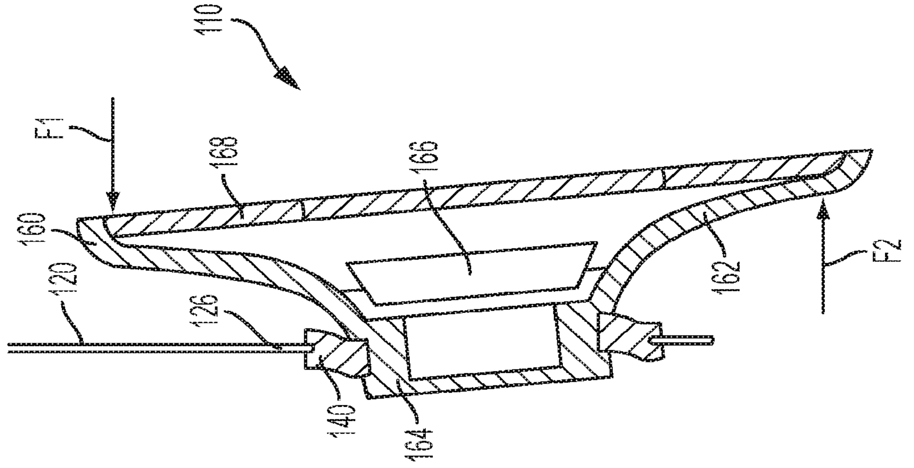
FIG. 8 is another cross-sectional elevation view of the ear assembly and the end portion of the band of FIG. 4 depicting the ear assembly in a flexed orientation, according to at least one embodiment of the present disclosure.
Figure 7:
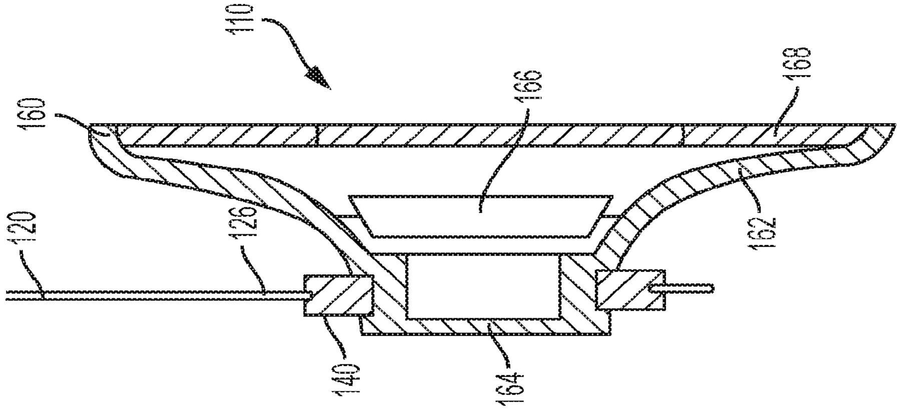
FIG. 7 is another cross-sectional elevation view of the ear assembly and the end portion of the band of FIG. 4 depicting the ear assembly in a neutral orientation, according to at least one embodiment of the present disclosure.

FIGS. 7 and 8 show that the flexible mount 140 can be configured to flex and/or deform under external forces or stresses. For example, the flexible mount 140 can deform between a neutral orientation (FIG. 7) and at least one flexed orientation (FIG. 8) when an external load is applied to the earpiece 160. When the personal acoustic system 100 is positioned relative to a user's head, the user's head can apply external loads to the earpiece 160. The flexible mount 140 can assume the neutral orientation before and after the assembly 100 has been placed on a user's head, and can assume the flexed orientation when the assembly 100 is positioned about a user's head. As the flexible mount 140 flexes, the earpiece 160 is configured to shift relative to the band 120. In such instances, the earpiece 160 acts as a self-adjusting earpiece for the user. For example, when the force F1 and/or F2 (FIG. 8) is applied to the earpiece 160 by the user's head and/or other external forces, the flexible mount 140 can flex to accommodate shifting of the earpiece 160 in response to the force(s) F1, F2.

The flexible mount 140 is sufficiently resilient such that it is configured to resume, or substantially resume, the unflexed or neutral orientation (FIG. 7) when the forces F1, F2 are removed from the earpiece 160. The flexible mount 140 can be configured to assume a plurality of different flexed orientations based on the placement, direction, and magnitude of the force(s) applied to the earpiece 160. In such a manner, the flexible mount 140 can provide flexibility and/or adjustability to the orientation of the earpiece 160 relative to the band 120. Moreover, the flexible mount 140 can provide a plurality of degrees of freedom about which the earpiece 160 can articulate relative to the band 120.

Figure 9:
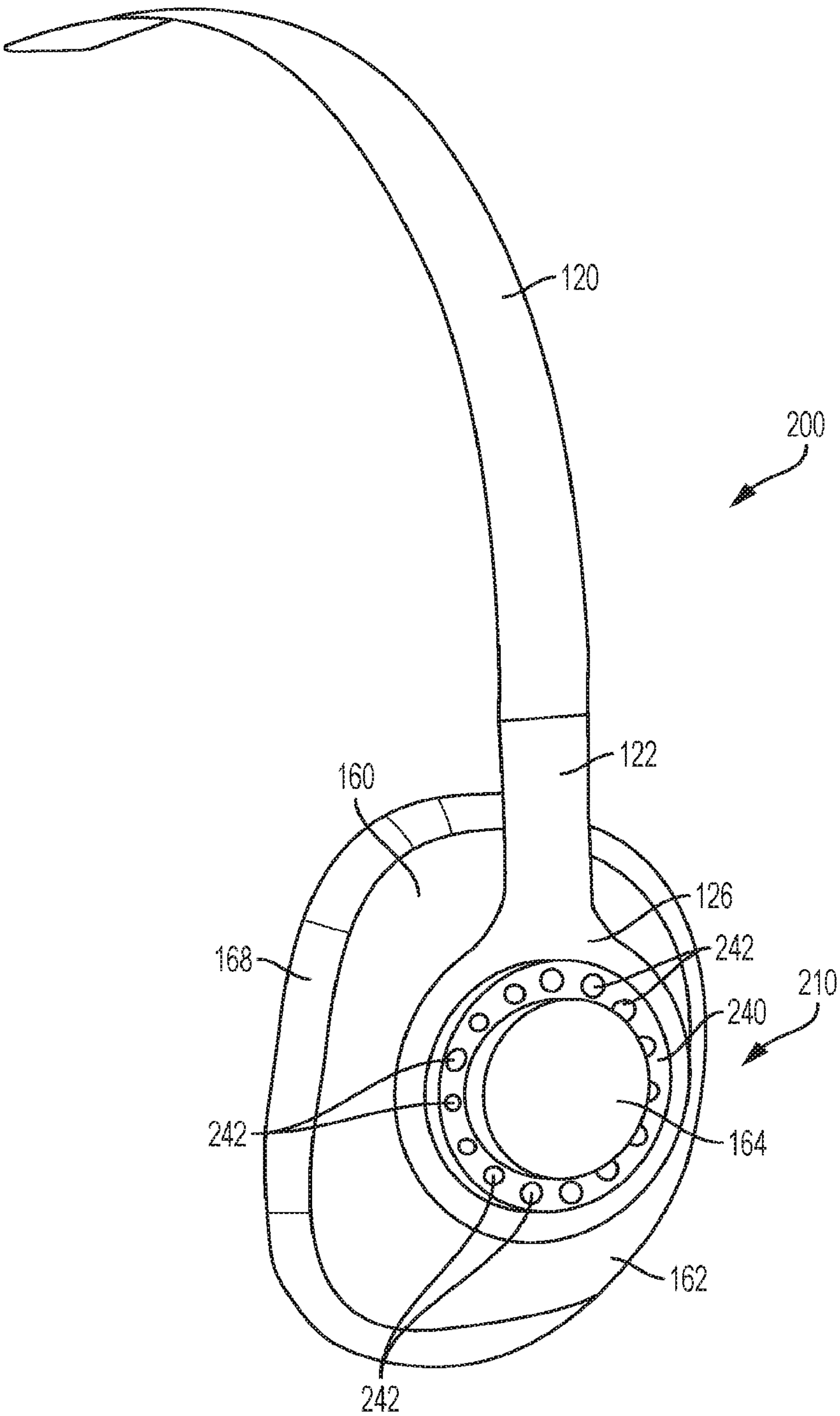
FIG. 9 is a perspective view of a portion of a personal acoustic system, according to at least one embodiment of the present disclosure.

FIG. 9 depicts a personal acoustic system 200 that includes the band 120 and the earpiece 160, with a flexible mount 240 positioned between the band 120 and the earpiece 160. The flexible mount 240 can be coupled to the band 120 and to the earpiece 160 in a suitable manner, such as by groove arrangements, adhesive, fasteners, and/or molding techniques as described herein with respect to the flexible mount 140. The flexible mount 240 is configured to flexibly connect the earpiece 160 to the band 120 such that the earpiece 160 can pivot, shift, wiggle, and/or rotate relative to the band 120. For example, the flexible mount 240 can move between a neutral orientation and at least one flexed orientation. The flexible mount 240 is comprised of an elastomeric material, such as thermoplastic elastomer and/or silicone.

In various instances, the flexible mount 240 can define a geometry that is selected to accommodate and/or facilitate deformation and/or flexing of the flexible mount 240 when a load is applied thereto. For example, the flexible mount 240 can include at least one relief feature 242. Referring still to the flexible mount 240 shown in FIG. 9, a plurality of relief features 242 are defined into the flexible mount 240. The relief features 242 comprise apertures at least partially through the flexible mount 240. In certain instances, the apertures can extend through the flexible mount 240 from a first (front) side to a second (back) side. The relief features 242 can permit further flexing of the flexible mount 240, and can reduce the amount of material and/or the weight of the mount 240.

In certain instances, a personal acoustic system can include at least one rotation inhibitor, which can prevent rotation of the various components and/or subassemblies of the personal acoustic system. For example, a rotation inhibitor can be positioned between an earpiece and a flexible mount of the personal acoustic system to prevent relative rotation between these components. Additionally or alternatively, a rotation inhibitor can be positioned between a yoke and a flexible mount of the personal acoustic system to prevent relative rotation between these components.

Figure 10:
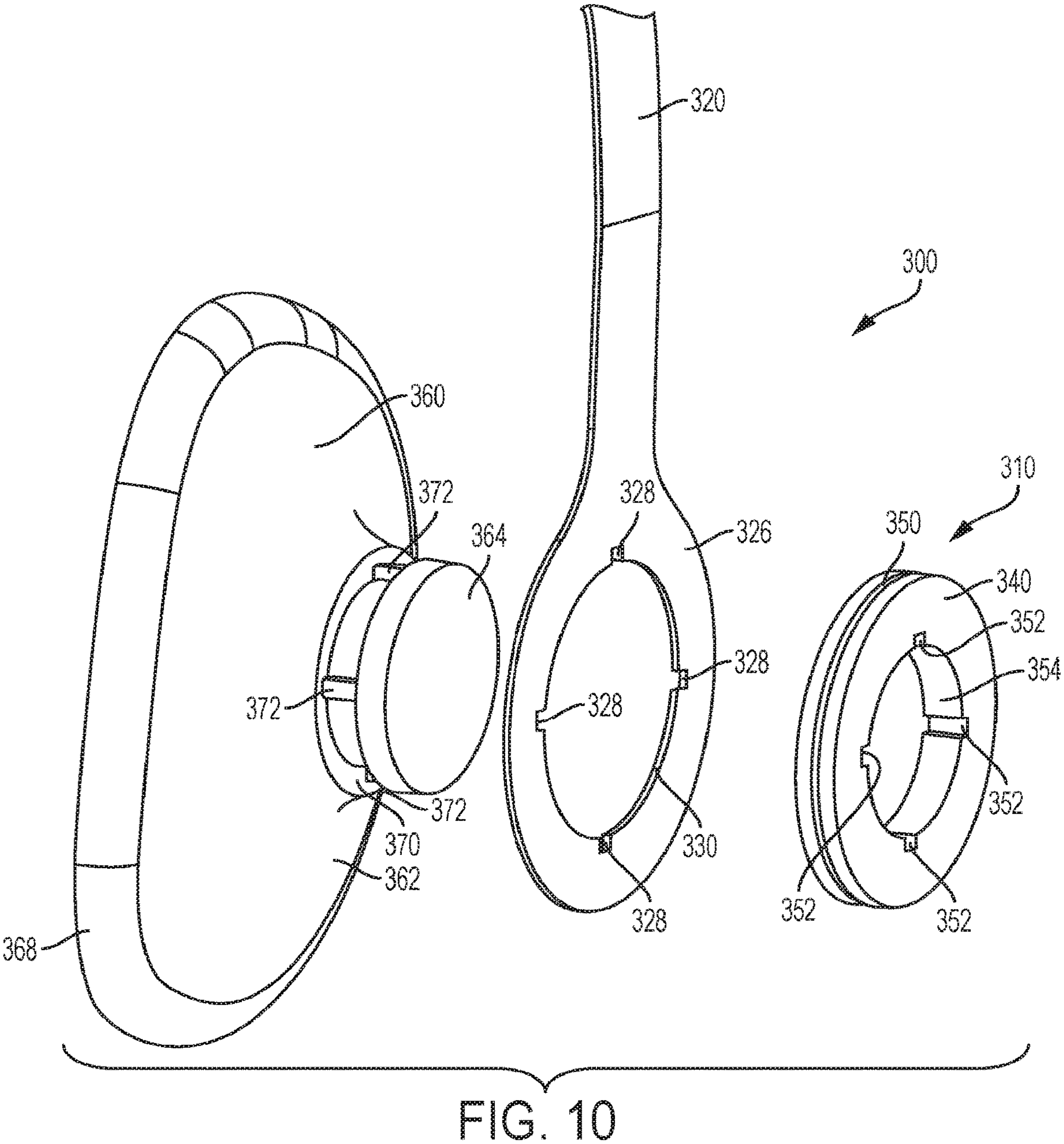
FIG. 10 is an exploded perspective view of a portion of a personal acoustic system, according to at least one embodiment of the present disclosure.
Figure 11:
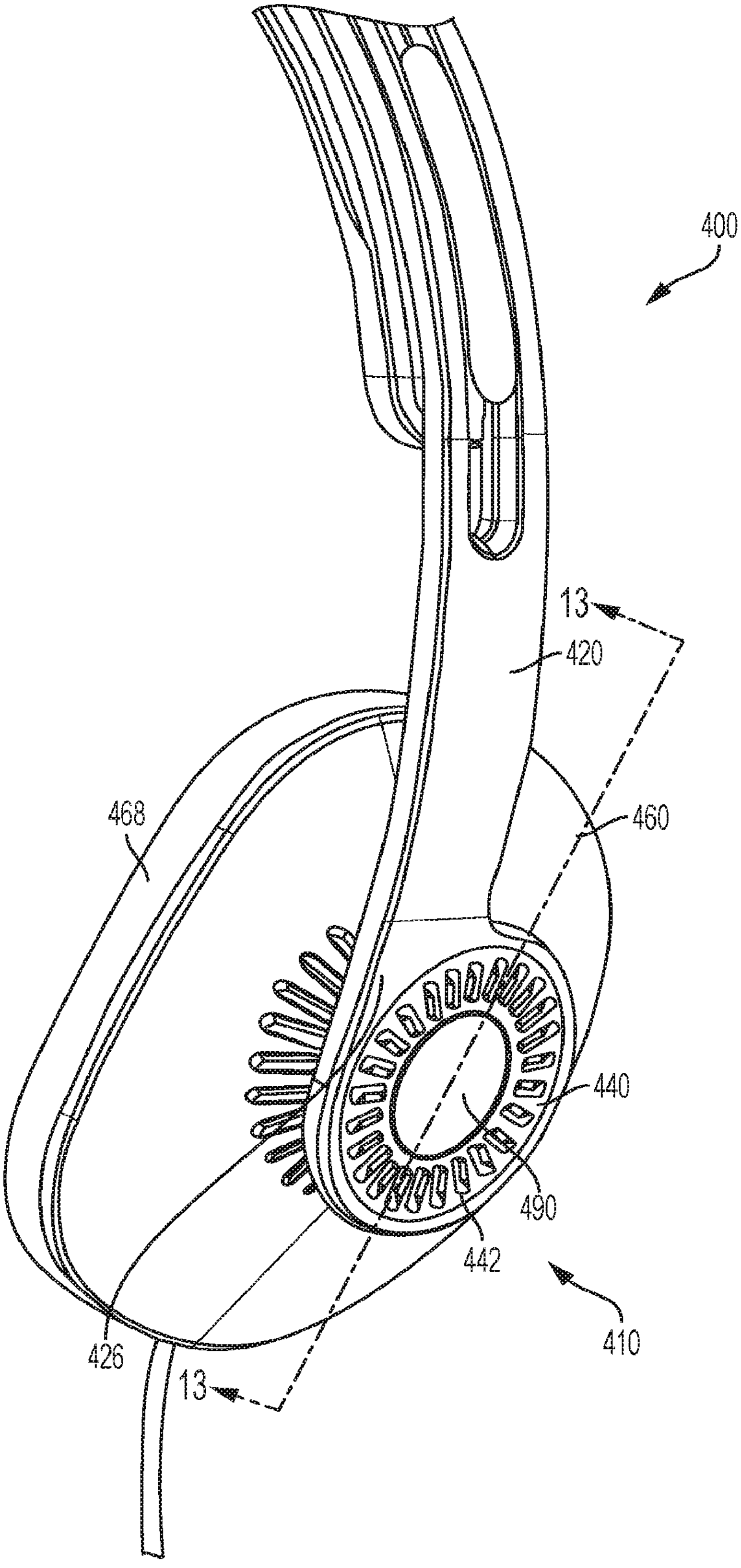
FIG. 11 is a perspective view of a portion of a personal acoustic system, according to at least one embodiment of the present disclosure.
Figure 12:
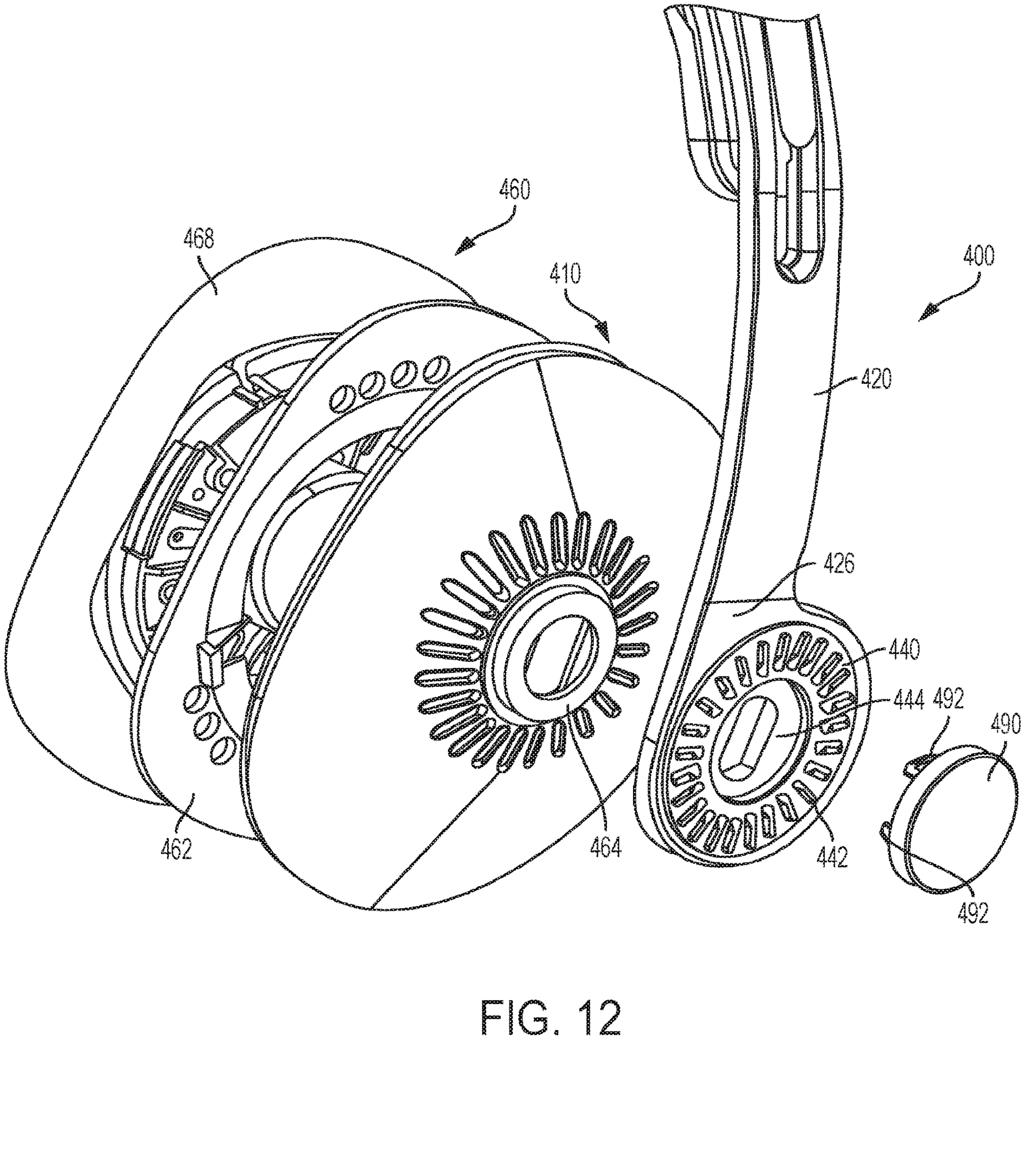
FIG. 12 is an exploded perspective view of the portion of the personal acoustic system of FIG. 11, according to at least one embodiment of the present disclosure.

FIG. 10 depicts a personal acoustic system 300 with such rotation inhibitors. The personal acoustic system 300 depicted in FIG. 10 is similar to the personal acoustic system 100 and 200 depicted in FIGS. 1-8 and FIG. 9, respectively, in various respects. For example, the personal speaker 300 depicted in FIG. 10 includes an earpiece 360 flexibly mounted to a band 320 via a flexible mount 340. Similar to the earpiece 160, the earpiece 360 includes a mounting portion 364, a housing 362 for at least one electroacoustic element, and a user-engaging portion 368. Moreover, the band 320 can include a first end and a second end, and a yoke 326 can extend from each end, similar to the band 120, for example. The flexible mount 340 can be positioned between the yoke 326 and the mounting portion 364 of the earpiece 360 by an arrangement of grooves, such as an annular groove 370 in the mounting portion 364 and an annular groove 350 in the flexible mount 340.

The personal acoustic system 300 shown in FIG. 10 also includes a plurality of rotation inhibitors. For example, the earpiece 360 includes a pattern of teeth or notches 372 in the groove 370, and the flexible mount 340 includes a corresponding pattern of teeth or notches 352 along an inner mounting surface 354. The notches 352 and 372 are dimensioned to fit together such that rotation of the flexible mount 340 relative to the earpiece 360 is inhibited and/or restrained. Referring still to FIG. 10, the yoke 326 includes a pattern of teeth or notches 328 along an inner mounting surface 330, and the flexible mount 340 includes a corresponding pattern of teeth notches within the groove 350. The notches in the groove 350 and the notches 328 on the yoke 326 are dimensioned to fit together such that rotation of the flexible mount 340 relative to the yoke 320 is inhibited and/or restrained.

In certain instances, a single notch can be utilized to prevent and/or inhibit rotation of relative components. In other instances, as shown in the embodiment of FIG. 10, two or more notches can be utilized to prevent and/or inhibit rotation of the relative components. In such instances, the notches may be spaced equidistantly around the perimeter of the mounting portions and/or surfaces of the interlocking components. The notches can define cutouts and corresponding protrusions and/or various interlocking geometries for preventing relative rotational movement. Additionally or alternatively, relative rotation of the various components can be inhibited by adhesives and/or fasteners, for example.

In various instances, a flexible mount can be retained between an earpiece and a yoke of a personal acoustic system. FIGS. 11-15 depict a flexible mount 440 of the personal acoustic system 400 that is retained between an earpiece 460 and a yoke 426 of a band 420. Similar to the earpieces 160 and 360, the earpiece 460 includes a mounting portion 464, a housing 462 for at least one acoustic element, and a user-engaging portion 468. Moreover, the band 420 includes a first end and a second end, and a yoke 426 extending from each end, similar to the bands 120 and 320, for example. In various instances, the flexible mount 440 comprises an elastomeric material, such as a thermoplastic elastomer and/or silicone, for example. The flexible mount 440 is resilient such that the flexible mount 440 can deform from a neutral orientation to a deformed orientation when an external load is applied and can resume the neutral orientation when the external load is removed. Referring to the embodiment of FIGS. 11-15, a plurality of relief features 442 are defined into the flexible mount 440 to further facilitate flexing and/or deformation of the flexible mount 440.

The flexible mount 440 is connected to the yoke 426 of the band 420. For example, the flexible mount 440 can be integrally formed with the yoke 426. In certain instances, the flexible mount 440 and the yoke 426 form a co-molded and/or injection-molded subassembly. The flexible mount 440 can be positioned at least partially within an inner mounting surface of the yoke 426. Additionally or alternatively, the flexible mount 440 can be secured to the yoke 426 with adhesives and/or fasteners, for example.

Figure 15:
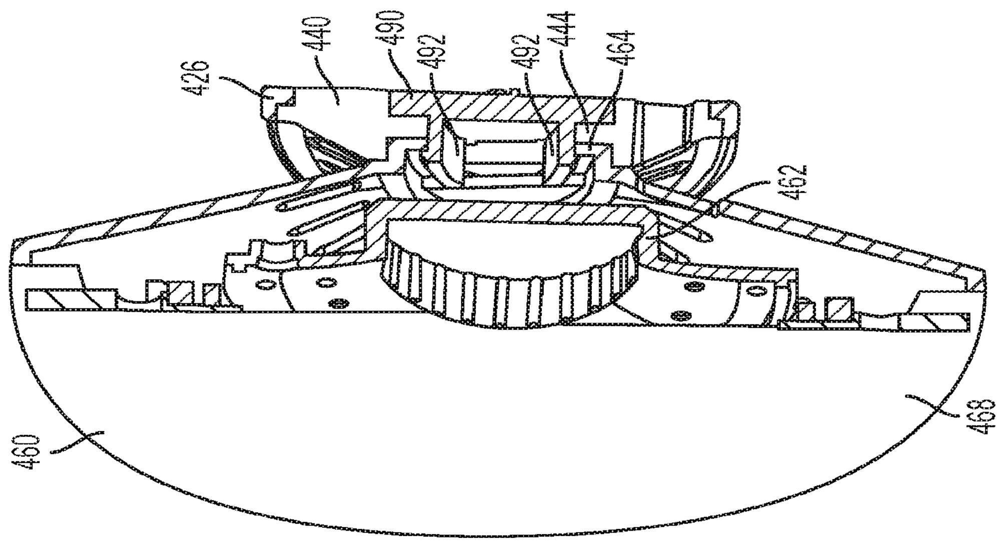
FIG. 15 is another cross-sectional perspective view of the ear assembly of FIG. 13 taken along the plane 11-11 indicated in FIG. 11, according to at least one embodiment of the present disclosure.
Figure 14:
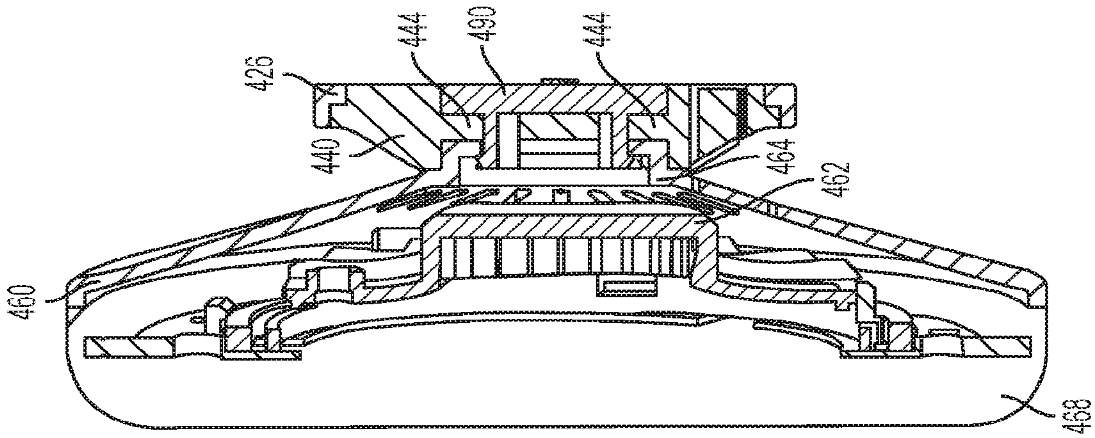
FIG. 14 is a cross-sectional elevation view of the ear assembly of FIG. 13 taken along the plane 11-11 indicated in FIG. 11, according to at least one embodiment of the present disclosure.
Figure 13:
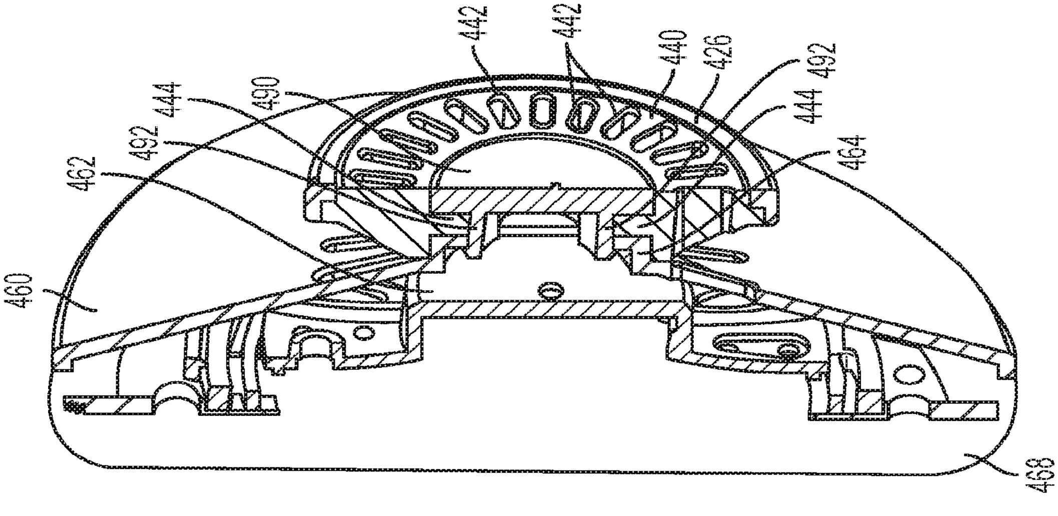
FIG. 13 is a cross-sectional perspective view of an ear assembly of the personal acoustic system of FIG. 11 taken along the plane 11-11 indicated in FIG. 11, according to at least one embodiment of the present disclosure.

In certain instances, the flexible mount 440 includes an inner mounting portion 444. The inner mounting portion 444 defines a flange protruding radially inward. In various instances, the inner mounting portion 444 is configured to be retained between the mounting portion 464 of the earpiece 460 and a clip 490. For example, the clip 490, which includes a plurality of spring members and/or cantilevered arms 492, is configured to engage the mounting portion 464 of the earpiece 460. When the clip 490 is engaged with the earpiece 460, the flange 444 of the flexible mount 440 can be retained between the clip 490 and the earpiece 460, as depicted in FIGS. 13-15.

In certain instances, the clip 490 can snap-fit into engagement with the mounting portion 464 of the earpiece 460. Moreover, the flange 444 can extend into a groove defined between the clip 490 and the mounting portion 464 of the earpiece 460. In such instances, the flexible mount 440, and thus the yoke 426 connected thereto, can be flexibly coupled to the earpiece 460 when the clip 490 is locked to the mounting portion 464. The flexible mount 440 can permit articulation of the earpiece 460 relative to the band 420 such that the placement of the earpiece 460 can be adjusted based on the shape of the user's head and/or the user's placement preferences.

To assemble the personal acoustic system 400, the flexible mount 440 can be integrally formed with the yoke 426 by at least one of the various molding techniques described herein. For example, the yoke 426 can be formed with an injection-molding process, and thereafter the flexible mount 44 can be co-molded with the yoke 426. In other instances, the flexible mount 440 can be coupled to the yoke 426 by at least one of the various coupling means described herein. Thereafter, the flexible mount 440 can be positioned in abutting engagement with the earpiece 460 such that the flange 444 of the flexible mount 440 is positioned in a portion of the groove defined by the mounting portion 464 of the earpiece 460. The clip 490 can then be snap-fit into engagement with the mounting portion 464 to hold the flexible mount 440 in abutting engagement with the earpiece 460. For example, the cantilevered arms 492 can be inserted into at least one aperture in the mounting portion 464 of the earpiece 460. When the clip 490 is engaged with the earpiece 460, the flexible mount 440 and the band 460 connected thereto can be secured to the earpiece 460. In various instances, the assembling method can further include mounting a second earpiece to the opposite end of the band 420.

In various embodiments, therefore, the present invention is directed to an assembly that comprises a headband, an earpiece, and an elastomeric grommet flexibly connecting the band to the earpiece. The headband comprises a first mount, and the earpiece comprises a second mount and an electroacoustic speaker. The elastomeric grommet is positioned intermediate the first mount and the second mount. The assembly could also comprise a second earpiece connected in a similar manner at an opposite end of the headband.

In various implementations, the first mount comprises an annular inner surface, and the second mount comprises an annular outer surface. The annular outer surface of the second mount can comprise a groove, in which case the elastomeric grommet can be positioned at least partially within the groove. Similarly, the elastomeric grommet could comprises a groove, and the annular inner surface can be positioned at least partially within the groove. Also, either or both of the first and second mounts could have a notched profile that prevent rotation of the elastomeric grommet relative to the earpiece or headband, as the case may be.

Preferably, the elastomeric grommet and the first mount are comprised of different materials. The elastomeric grommet, for example, could comprise thermoplastic elastomer or silicone, whereas the headband and earpiece may comprise rigid, non-elastomeric plastic or steel.

Further, the elastomeric grommet and the headband could comprise a co-molded, integrally-formed subassembly. In such an embodiment, the headphone assembly could be manufactured by molding (e.g., co-molding) the elastomeric grommet at an end of the headband of the headphone assembly and connecting the elastomeric grommet to the mount of the earpiece. The same process could be used for a headphone assembly with a second earpiece at the other end of the headband.

Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and illustrative. Variations and changes thereto may be made without departing from the scope of the claims. For example, the features illustrated or described in connection with one exemplary embodiment may be combined with the features of at least one other embodiment. Such modifications and variations are intended to be included within the scope of the present disclosure. This application is therefore intended to cover any variations, uses, or adaptations of the disclosed embodiments using its general principles. Further, this application is intended to cover such departures from the present disclosure as come within known or customary practice in the relevant art.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements, but is not limited to possessing only those one or more elements. Likewise, an element of a system, device, assembly, or apparatus that "comprises," "has," "includes" or "contains" one or more features possesses those one or more features, but is not limited to possessing only those one or more features.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. An assembly, comprising:

a bracket comprising a first mount;

an earpiece comprising a second mount and an electroacoustic speaker, wherein the second mount comprises a circumferential mounting surface; and an elastomeric grommet flexibly connecting the bracket to the earpiece, wherein the elastomeric grommet is positioned intermediate the first mount and the second mount, wherein the elastomeric grommet comprises an inner mounting surface, and wherein the inner mounting surface is positioned around the circumferential mounting surface to connect the elastomeric grommet to the earpiece.

2. The assembly of claim 1, wherein the first mount comprises an annular inner surface.

3. The assembly of claim 1, wherein the circumferential mounting surface comprises a groove, wherein a portion of the elastomeric grommet is positioned at least partially within the groove, and wherein the portion of the elastomeric grommet is friction-fit within the groove.

4. The assembly of claim 1, wherein the circumferential mounting surface comprises a groove, wherein the groove comprises an outer notched profile, and wherein the elastomeric grommet comprises an inner notched profile corresponding to the outer notched profile to prevent rotation of the elastomeric grommet relative to the earpiece.

5. The assembly of claim 1, wherein the elastomeric grommet is comprised of a first material, wherein the first mount is comprised of a second material, and wherein the second material is different than the first material.

6. The assembly of claim 1, wherein the elastomeric grommet comprises a groove, and wherein the inner mounting surface is positioned at least partially within the groove.

7. The assembly of claim 6, wherein the groove comprises an outer notched profile, and wherein the inner mounting surface comprises an inner notched profile corresponding to the outer notched profile.

8. The assembly of claim 1, wherein the elastomeric grommet is comprised of a material selected from a group consisting of thermoplastic elastomer and silicone.

9. The assembly of claim 1, wherein at least one relief feature is defined into the elastomeric grommet.

10. An assembly, comprising:

a first mount;

an earpiece comprising a second mount and an electroacoustic speaker, wherein the second mount comprises a circumferential mounting surface; and an elastomeric grommet flexibly connecting the first mount to the second mount, wherein the elastomeric grommet is positioned intermediate the first mount and the second mount, wherein the elastomeric grommet comprises an inner mounting surface, and wherein the inner mounting surface is positioned around the circumferential mounting surface to connect the elastomeric grommet to the earpiece.

11. The assembly of claim 10, wherein the first mount comprises an annular inner surface.

12. The assembly of claim 10, wherein the circumferential mounting surface comprises a groove, wherein a portion of the elastomeric grommet is positioned at least partially within the groove, and wherein the portion of the elastomeric grommet is friction-fit within the groove.

13. The assembly of claim 10, wherein the circumferential mounting surface comprises a groove, wherein the groove comprises an outer notched profile, and wherein the elastomeric grommet comprises an inner notched profile corresponding to the outer notched profile to prevent rotation of the elastomeric grommet relative to the earpiece.

14. The assembly of claim 10, wherein the elastomeric grommet is comprised of a first material, wherein the first mount is comprised of a second material, and wherein the second material is different than the first material.

15. The assembly of claim 10, wherein the elastomeric grommet comprises a groove, and wherein the inner mounting surface is positioned at least partially within the groove.

16. The assembly of claim 15, wherein the groove comprises an outer notched profile, and wherein the inner mounting surface comprises an inner notched profile corresponding to the outer notched profile.

17. The assembly of claim 10, wherein the elastomeric grommet is comprised of a material selected from a group consisting of thermoplastic elastomer and silicone.

18. The assembly of claim 10, wherein at least one relief feature is defined into the elastomeric grommet.

19. A headphone assembly, comprising:

a first earpiece comprising a first earpiece mount and a first electroacoustic speaker, wherein the first earpiece mount comprises a first circumferential mounting surface;

a first elastomeric grommet flexibly connecting the first earpiece mount to a first support portion, wherein the first elastomeric grommet comprises a first inner mounting surface, and wherein the first inner mounting surface is positioned around the first circumferential mounting surface to connect the first elastomeric grommet to the first earpiece;

a second earpiece comprising a second earpiece mount and a second electroacoustic speaker, wherein the second earpiece mount comprises a second circumferential mounting surface;

a second elastomeric grommet flexibly connecting the second earpiece mount to a second support portion, wherein the second elastomeric grommet comprises a second inner mounting surface, and wherein the second inner mounting surface is positioned around the second circumferential mounting surface to connect the second elastomeric grommet to the second earpiece.

20. The assembly of claim 10, wherein the first elastomeric grommet is comprised of a first material selected from a group consisting of thermoplastic elastomer and silicone, wherein the first earpiece mount is comprised of a second material, and wherein the second material is different than the first material.

* * * * *